(12) United States Patent
Rashidi Doust

(10) Patent No.: US 12,000,578 B2
(45) Date of Patent: Jun. 4, 2024

(54) ADAPTABLE FIRE RESISTANT HOUSING FOR LIGHT FIXTURES

(71) Applicant: ELITE LIGHTING, Commerce, CA (US)

(72) Inventor: Hamid Rashidi Doust, Beverly Hills, CA (US)

( * ) Notice: Subject to any disclaimer, the term of this patent is extended or adjusted under 35 U.S.C. 154(b) by 0 days.

(21) Appl. No.: 17/982,443

(22) Filed: Nov. 7, 2022

(65) Prior Publication Data
US 2024/0151389 A1 May 9, 2024

(51) Int. Cl.
*F21V 29/89* (2015.01)
*F21S 8/02* (2006.01)
(Continued)

(52) U.S. Cl.
CPC .............. *F21V 29/89* (2015.01); *F21V 21/14* (2013.01); *F21S 8/02* (2013.01); *F21S 8/022* (2013.01); *F21S 8/024* (2013.01); *F21S 8/026* (2013.01); *F21S 8/028* (2013.01); *F21V 21/04* (2013.01); *F21V 21/041* (2013.01); *F21V 21/042* (2013.01); *F21V 21/043* (2013.01); *F21V 21/044* (2013.01); *F21V 21/045* (2013.01); *F21V 21/046* (2013.01); *F21V 21/047* (2013.01); *F21V 21/048* (2013.01); *F21V 21/049* (2013.01); *H02G 3/08* (2013.01); *H02G 3/081* (2013.01); *H02G 3/085* (2013.01); *H02G 3/086* (2013.01); *H02G 3/088* (2013.01); *H02G 3/10* (2013.01); *H02G 3/105* (2013.01); *H02G 3/12* (2013.01); *H02G 3/121* (2013.01); *H02G 3/123* (2013.01); *H02G 3/125* (2013.01); *H02G 3/20* (2013.01)

(58) Field of Classification Search
CPC ...... F21V 21/04; F21V 21/041; F21V 21/042; F21V 21/043; F21V 21/044; F21V 21/045; F21V 21/046; F21V 21/047; F21V 21/048; F21V 21/049; F21S 8/02; F21S 8/022; F21S 8/024; F21S 8/026; F21S 8/028; H02G 3/08–20
See application file for complete search history.

(56) References Cited

U.S. PATENT DOCUMENTS 9,964,266 B2 5/2018 Danesh
11,015,785 B1 * 5/2021 Schubert ................. F21V 15/01
(Continued)

FOREIGN PATENT DOCUMENTS

DE 202012101411 U1 * 4/2013 .............. F21S 8/026
KR 101625458 B1 * 5/2016 .......... E04H 12/2253

OTHER PUBLICATIONS

Machine translation of DE 202012101411 U1 retrieved from the FIT database of PE2E search. (Year: 2023).*
Machine translation of KR 101625458 B1 retrieved from the FIT database of PE2E search. (Year: 2023).*
(Continued)

Primary Examiner — Colin J Cattanach
(74) Attorney, Agent, or Firm — Payam Moradian

(57) ABSTRACT

Provided is an adaptable fire-resistant housing for a light fixture, comprising: a. a junction box made from steel, the junction box having an opening on a bottom configured to receive the light fixture; and b. an adjustable ring attached to the bottom of the housing, the adjustable ring having an opening configured to be attached to the light fixture or an adapter ring; wherein the light fixture or the adapter ring is attached to the adjustable ring.

16 Claims, 17 Drawing Sheets

(51) Int. Cl.
*F21V 21/04* (2006.01)
*F21V 21/14* (2006.01)
*H02G 3/08* (2006.01)
*H02G 3/10* (2006.01)
*H02G 3/12* (2006.01)
*H02G 3/20* (2006.01)

(56) References Cited

U.S. PATENT DOCUMENTS

| | | | | |
|---|---|---|---|---|
| 2016/0146411 | A1* | 5/2016 | Luo | F21V 29/70 |
| | | | | 362/364 |
| 2016/0327251 | A1* | 11/2016 | Clark | F21V 21/048 |
| 2020/0032988 | A1* | 1/2020 | Schubert | F21V 21/04 |

OTHER PUBLICATIONS https://www.build.com/product/summary/1810336?uid=4286632&jmtest=gg-gbav2_4286632&inv=1&&source=gg-gba-pla_4286632!c1710656546!a75290221628!dc!ng&gclid=CjwKCAiA9qKbBhAzEiwAS4yeDbweby5nQX86P0-DDh9dWO8T6IfHLrC-gcUCxpyX_3f9pR2JSLnxChoCRSQQAvD_BwE&gclsrc=aw.ds, accessed Nov. 7, 2022.
https://buyriteelectric.com/products/dmf-drdhnjo-surface-frame-octagonal-4-fire-rated-sound-rated?currency=USD&variant=30700343328871&utm_medium=cpc&utm_source=google&utm_campaign=Google%20Shopping&gclid=CjwKCAiA9qKbBhAzEiwAS4yeDQYvRS9PgzINaf04z4xGuJvjiCqTqQzDZ8Wyu_H29dCshVDac20VAhoCbnoQAvD_BwE, accessed Nov. 7, 2022.
https://www.alconlighting.com/dmf-drdhnj.html, accessed Nov. 7, 2022.

* cited by examiner

ADAPTABLE FIRE RESISTANT HOUSING FOR LIGHT FIXTURES

BACKGROUND SECTION OF THE INVENTION

Recessed light fixtures are placed in the ceiling. Surface mounted light fixtures are attached below the ceiling.

There is a need to contain a fire in a light fixture. Otherwise a fire from one lummaire in a ceiling can spread to a floor above the ceiling where the luminaire is placed. There is a need in the art for a fire rated light fixture that addresses the above issues and is compatible with different light fixtures.

SUMMARY SECTION OF THE INVENTION

Provided is an adaptable fire-resistant housing for a light fixture, comprising: a junction box made from steel, the junction box having an opening on a bottom configured to receive the light fixture; and an adjustable ring attached to the bottom of the housing, the adjustable ring having an opening configured to be attached to the light fixture or an adapter ring; wherein the light fixture or the adapter ring is attached to the adjustable ring.

Provided is an adaptable fire-resistant housing for a light fixture, comprising: a junction box, the junction box having an opening on a bottom configured to receive the light fixture; a frame attached to the bottom of the junction box; and a ring attached to the frame, the ring configured to be attached to the light fixture or to an adapter ring. The ring can be an adjustable ring. The adjustable ring can have a track configured to be adjusted in a vertical direction. The adjustable ring can be adjustably attached to the frame. The adjustable ring is attacked to a vertically upward tab of the frame. The frame can have a square profile on an outside and a round profile on an inside. The adapter ring can be attached to a bottom of the adjustable ring. The adjustable ring and the adapter ring can have complementary openings for a fastener. The adjustable ring can be configured to be attached to a surface mount light. A gasket is placed under the frame. the frame has an upwardly vertical portion that attaches to outside of the junction box. The junction box can have a height of about 12 to 20 cm. The junction box can be a cuboid with sharp or round corners, and has a width of about 10 cm to 16 cm. The frame can be a disc with a square profile on an outside and a circular profile on an inside, and further comprises a first vertically upward portion for attachment to outside of the junction box and a second vertically upward portion for attachment to the ring.

Provided is an adaptable fire-resistant housing for a light fixture, comprising: a junction box, the junction box having an opening on a bottom configured to receive a light fixture, a frame attached to the bottom of the junction box; an adjustable ring attached to the frame, the adjustable ring having a vertical track that slides relative to the frame, the adjustable ring further having one or more openings; and an adapter ring with one or more openings that are complementary to the openings of the adjustable ring; wherein the adjustable ring is configured to be attached to a surface mount light or to the adapter ring; and wherein the housing with the adapter ring is configured to receive a recessed light fixture; wherein the adapter ring is configured to extend below the junction box and compensate for the height of a ceiling (such as drywall). The frame can be a disc with a square profile on outside and a circular profile on inside, and further comprises a first vertically upward portion for attachment to outside of the junction box and a second vertically upward portion for attachment to the adjustable ring. The second vertically upward portion of the frame can have two openings, each opening configured to be attached to the adjustable ring in an exclusive manner. The adjustable ring can have a vertical track on a side, and at least two horizontally oriented openings on the bottom inside of the ring. The adapter ring can have at least two horizontally oriented openings on the top of the ring.

DETAILED DESCRIPTION OF INVENTION

Figure 1:
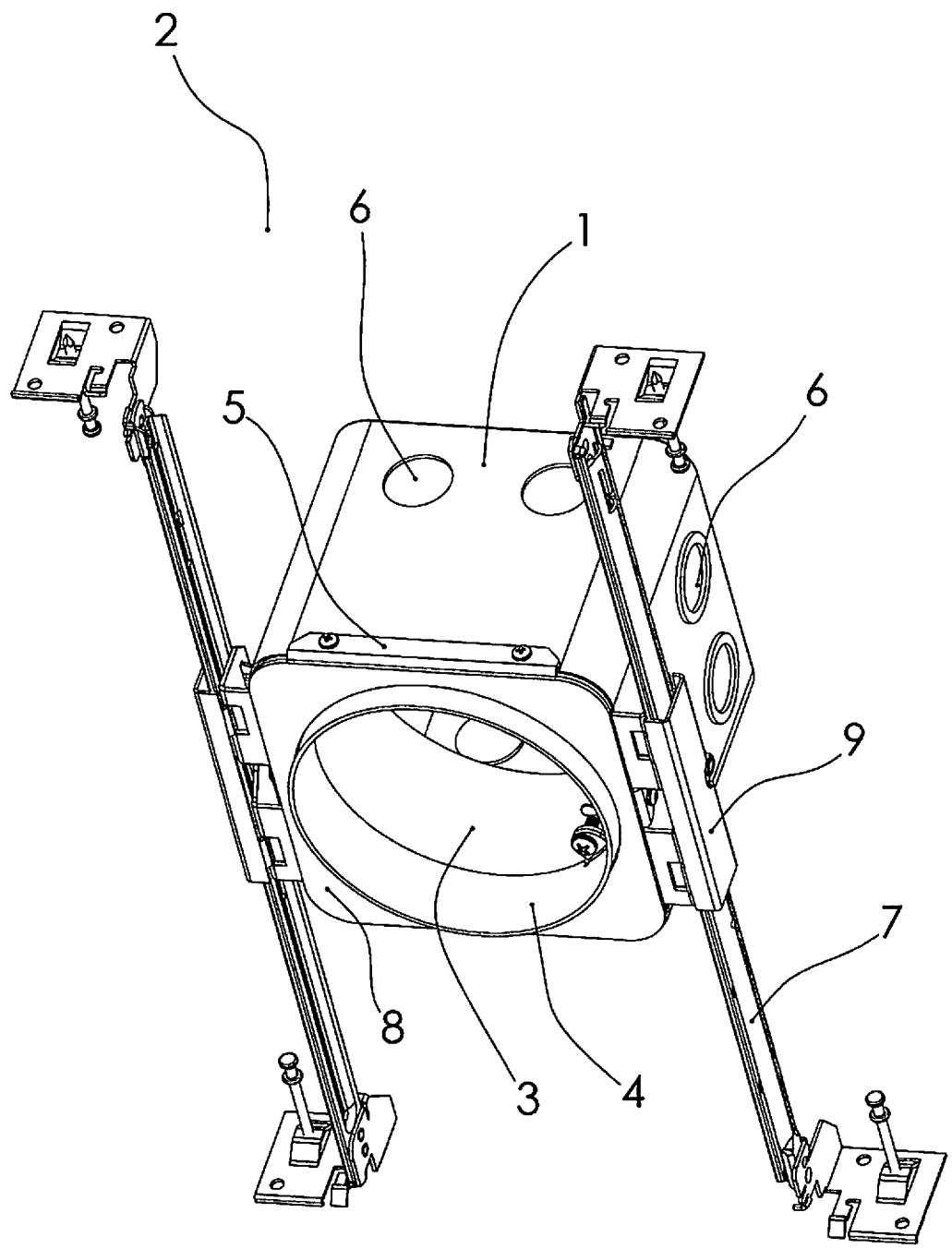
FIG. 1 illustrates a perspective view of the fire-resistant housing.

Provided is an adjustable and adaptable fire-resistant housing 2 configured to receive for both recessed 20 and surface mounted 30 LED (Light Emitting Diode) light fixtures. Different light fixtures, such as retrofit, recessed 20, downlight, round, disk light, surface mount 30, both round and square, can be installed.

The junction box 1 can be made from a fire-resistant metal, such as steel. The thickness of the steel can be 0.10 to 0.50 inches, such as 0.20 to 0.40 inches. The junction box 1 can be colored red on the outside. The junction box 1 can be made from uniform cast steel, and made from a single piece.

The junction box 1 can be non-standard, and custom made. The junction box 1 can have a height of about 12 to 20 cm, such as about 14 to 18 cm, or such as 15-16 cm, and a width of about 10 cm to 16 cm, such as 11 cm to 15 cm, such as 13 cm. The junction box 1 can be a square or rectangular. As illustrated the junction box 1 is a cuboid with an opening in the bottom. The junction box 1 can weigh 1.2 kg to 2 Kg, such as about. 1.6 kg. The junction box 1 can support a maximum current of 0.14 A and a maximum wattage of 14 Watts. The junction box 1 can be fire resistant. As used herein, fire-resistant or fire rated means complying with a 2-hour fire rating test, based on at least any one of these standards: UL 263, ASTM E119 and CAN ULC S101.

The junction box 1 can be enclosed on the sides and the top, and have an opening on the bottom for placement of a light fixture 20. The junction box 1 can have openings 6 on the sides for attachment of cables carrying power and/or other electrical signals. The openings 6 can have a cover. Each side of the junction side 1 can have two openings 6. The openings 6 can be capped when not in user.

The fire-resistant housing 2 can have a vertically adjustable ring 3. The adjustable ring 3 can be attached to the housing 2 through frame 5. Frame 5 can have an outside that is shaped like the housing 2 (in this case square) and an inside that is shaped like a ring (circular). Frame 5 is attached directly to the junction box 1, and is configured to be slidably attached to the adjustable ring 3. As illustrated, frame 5 is a disc with a square profile on the outside and a circular profile on the inside, and further has a first vertically upward portion for attachment to outside of the junction box 1 and a second vertically upward portion (one or more tabs 12) for attachment to the adjustable ring.

The adjustable ring 3 can have a plurality of fastener openings 14 configured for attaching the ring to a surface mounted light. A fastener 10 can be used to attach the adjustable ring 3 to the top of a surface mounted light fixture 30.

Alternatively, adapter ring 4 can be attached to the bottom of the adjustable ring 4. When the adapter ring 4 is attached, the housing 2 becomes configured to receive a recessed light fixture 20. The adapter ring 4 and adjustable ring 3 can have complementary openings that overlap (line up) with each other to receive the same fastener and further can have the same diameter, so together they make a larger cylinder.

Alternatively, an adapter ring 4 can be attached to the adjustable ring 3. The adapter ring 4 can be attached to the bottom ring through the same fastener openings 14. With adapter ring 4, housing 2 can be configured to accept a recessed light fixture 20. Adapter ring 4 extends below junction box 1 and compensates for the height of the ceiling 21. Examples of ceilings include drywall, sheetrock, gypsum board, wallboard, cement board, cement layer and fiberglass layers, plaster, wood, metal, fiberglass, mineral fiber, PVC, and mixture thereof.

Frame 5 is attached to the bottom of the junction box 1. The frame 5 can have two sides that come up (upwardly vertical portions on opposite sides that extend more than 50%, such as more 70% of the sides of junction box 1) and attach to the outside of the junction box 1 with fasteners. The sides of frame 5 can extend to entire straight side of junction box 1, not including the curved corners. The frame 5 can have a circular opening and a square or rectangular periphery with or without round corners. Frame 5 is configured to fit on the bottom of junction box 1 and can have the same overall profile as the bottom or top of the junction box 1.

Gasket 8 is attached to the bottom of frame 5. The gasket 8 have the same profile as frame 5, a square profile with a ring-shaped opening. The gasket 8 can make an air-tight seal. Inside of Junction box 1 can be dust proof, waterproof, and otherwise sealed from the environment. Bar hangers 7 are attached to the sides of the junction box 1.

Figure 2:
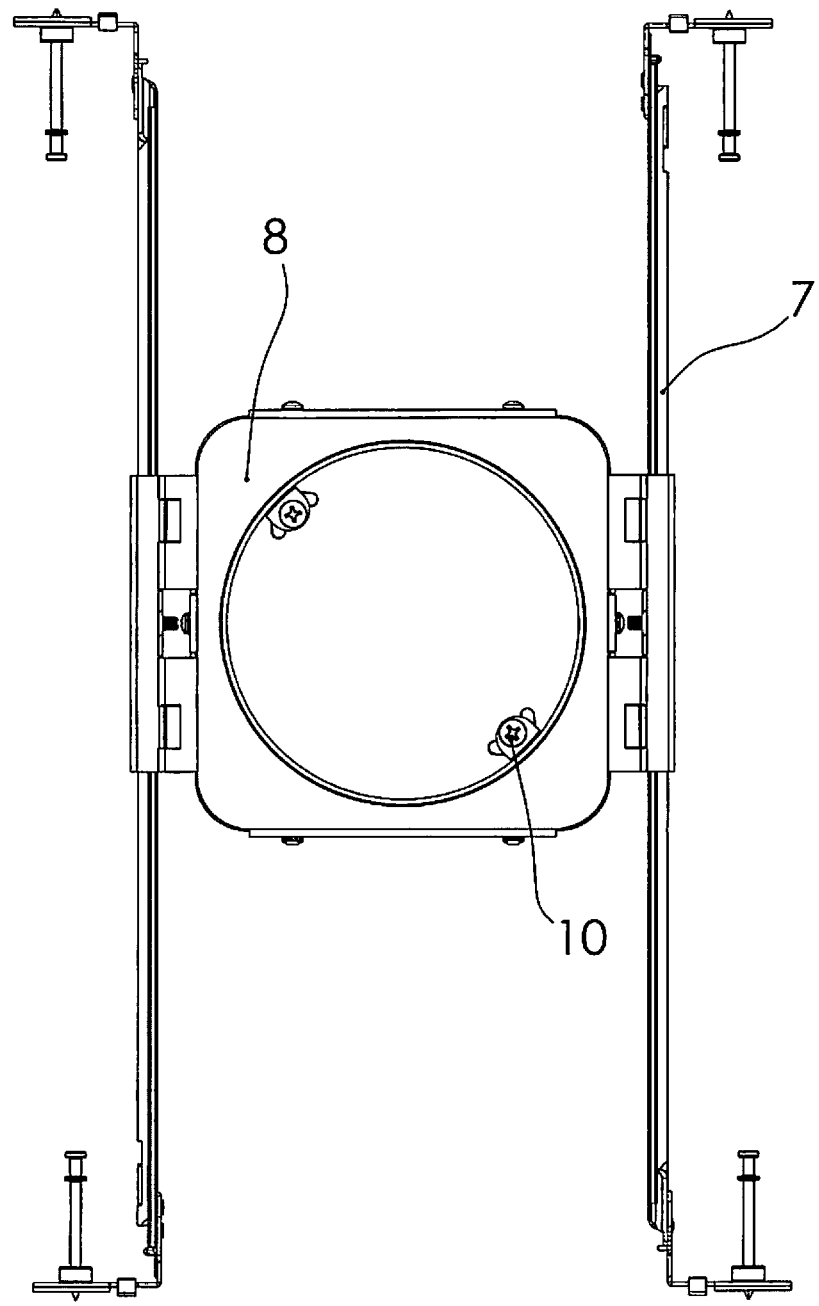
FIG. 2 illustrates a bottom view of the fire-resistant housing.

FIG. 2 illustrates a bottom view of the junction box 1. Visible in the view is gasket 8, bar hangers 7, and fastener 10 for attaching the adapter ring 4 to the adjustable ring 3. A screw can be used as any fastener discussed herein.

Figure 3:
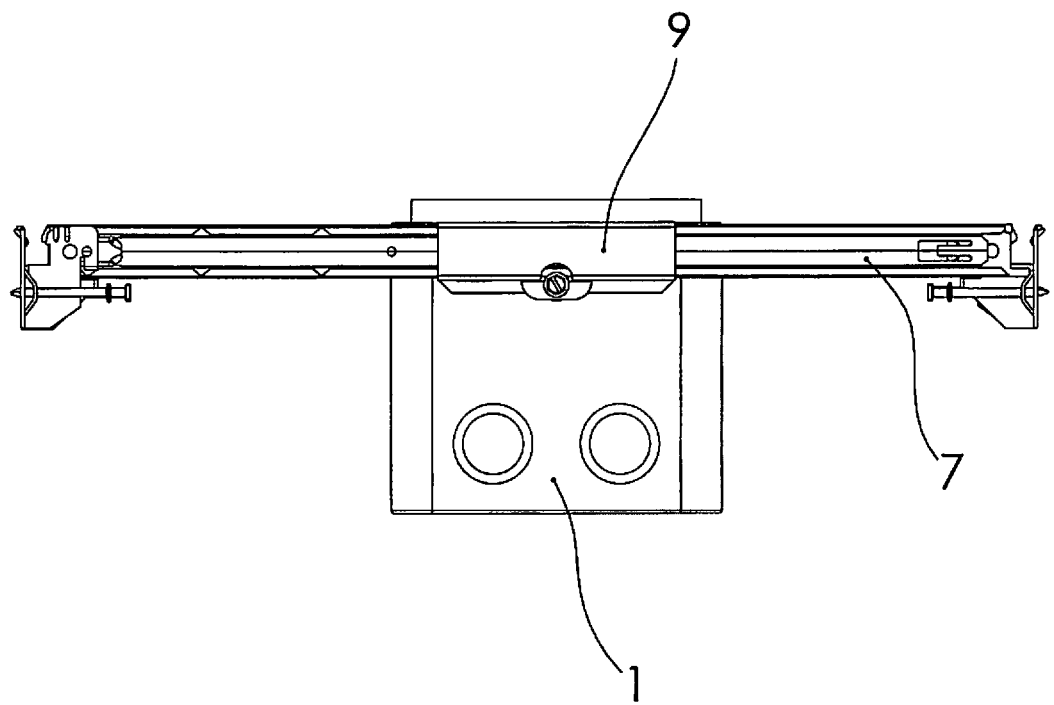
FIG. 3 illustrates a side view of the fire-resistant housing.
Figure 4:
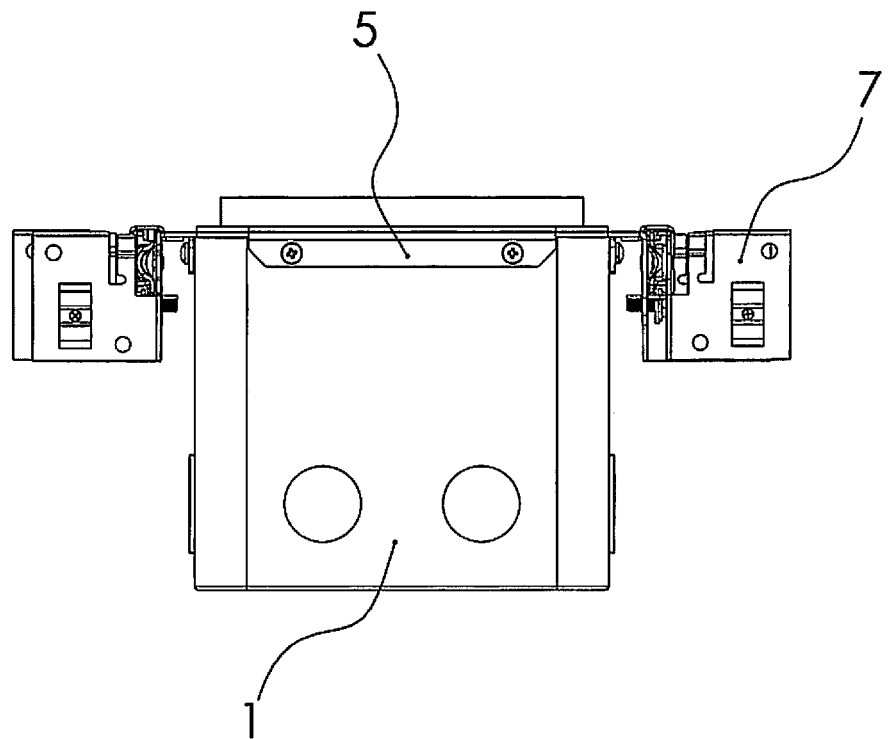
FIG. 4 illustrates a side view of the fire-resistant housing.

FIGS. 3 and 4 are side view of the junction box 1. Bar hangers 7 are attached to the opposite sides of the junction box 1.

Figure 5:
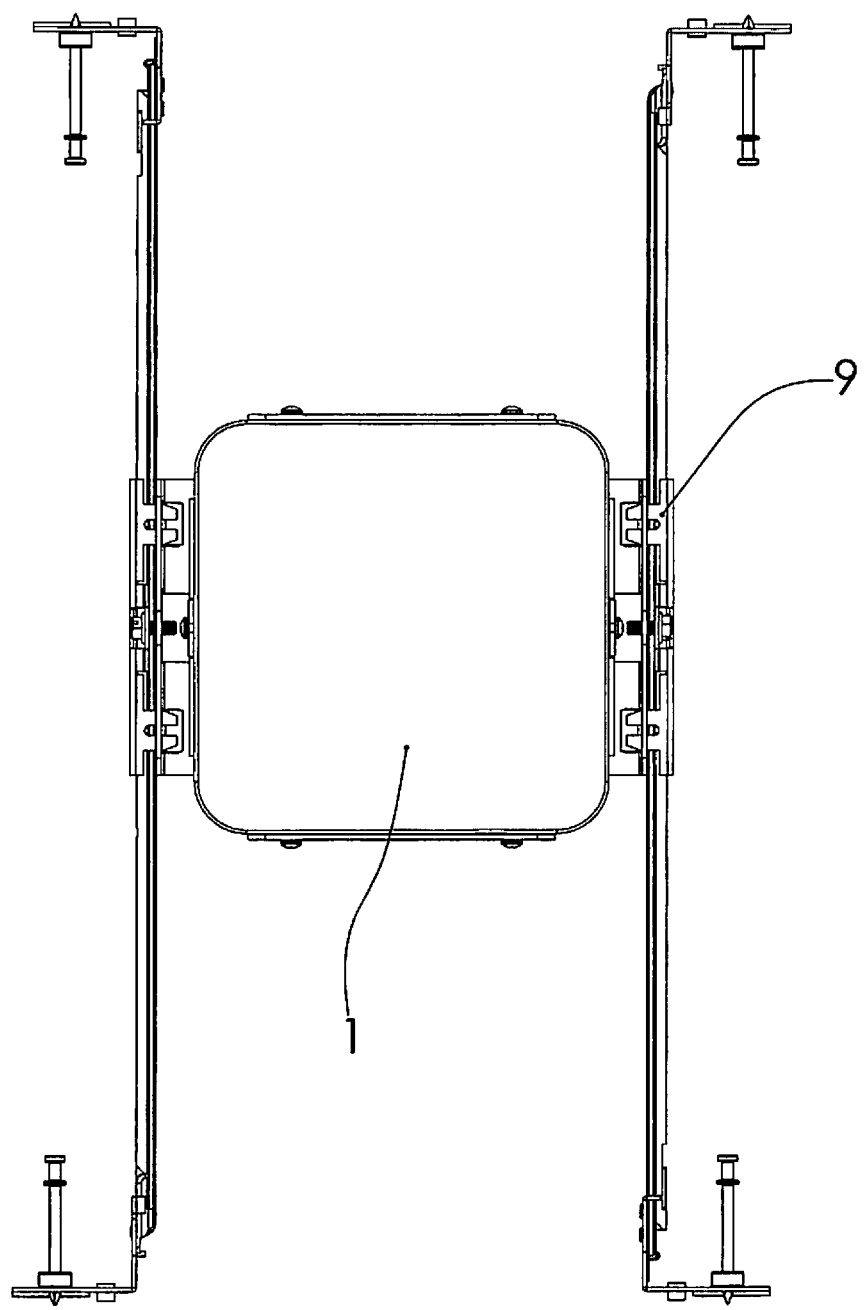
FIG. 5 illustrates a top view of the fire-resistant housing.
Figure 6:
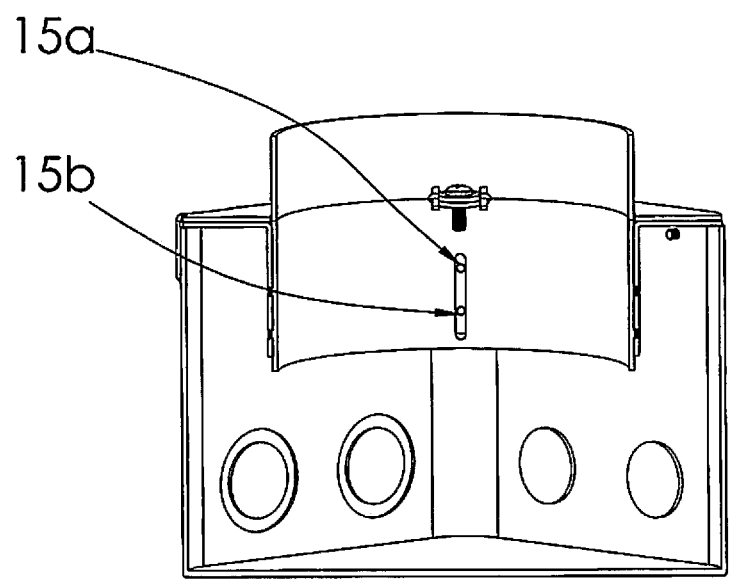
FIG. 6 illustrated the adapter ring coming out of the junction box to compensate for the height of the ceiling.

FIG. 5 illustrates a top of the junction box 1 and FIG. 6 illustrates a top perspective view thereof. The junction box 1 has no openings on top and is shown as a single piece on the top.

Figure 7:
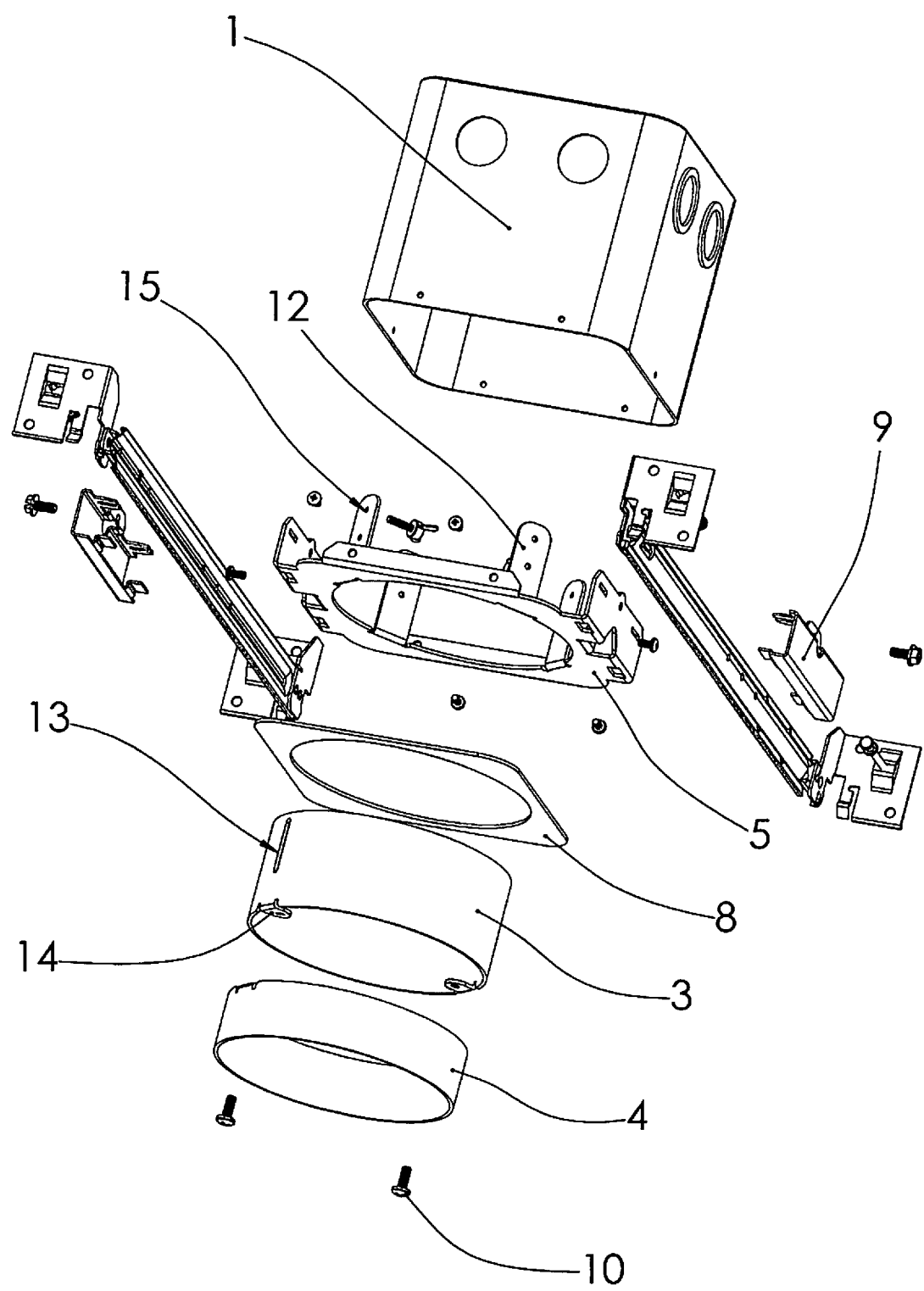
FIG. 7 illustrates an exploded view of the fire-resistant housing.

FIG. 7 illustrates an exploded view of the junction box 1. Junction box 1 is shown on the top. As illustrated, junction box 1 is a cube/cuboid (four sides and a top, and an open bottom) with an opening on the bottom and round corners. Each side of the junction box 1 has two openings 6 for attachment and passage of wires. The junction box 1 further has fastener (screw) openings on all four sides.

Frame 5 is attached to the opposite sides of junction box 1. Frame 5 has a square profile on the outside and a circular profile on the inside. Frame 5 is attached to the bottom of junction box 1, with vertical side members attaching to the outside of junction box 1. Frame 5 can have one or more tabs 12 that are vertically oriented in an upward direction and stay inside of junction box 1. Bar hangers 7 are attached to opposite sides of junction box 1 through bracket 9. Frame 5 is attached to alternate opposite sides of the junction box 1. Both attachments are on the outside and on the lower one inch of junction box 1. The tabs 12 can have one, two or more openings 6. As illustrated, there are two tabs 12 with two openings 15 each. Tabs 12 are placed on the opposite sides of frame 5.

Gasket 8, with a square outer profile and round inner profile is attached to the bottom of frame 5. The gasket 8 is a thin disc with a thickness of less than 0.5 inches and made from fire-resistant rubber.

Adjustable ring 3 is placed inside of junction box 1, and is capable of moving in a vertical direction to allow for adjustment of the height of the housing 2 depending on the need to attach a particular light fixture. Adjustable Ring 3 has a vertical track 13. A fastener (can be a winged screw which can be manually adjusted) goes through track 13 from inside of the adjustable ring 3 to tab 12 of frame 5. The fastener attaches to one of the two openings 15 on tab 12 of frame 5. Adjustable ring 3 can be adjusted vertically in relation to tab 12, which is stationary.

Adjustable ring 3 can be directly attached to a surface mount light 30 through fastener openings 14, which are positioned on the bottom of Adjustable ring 3, in an inwardly horizontal direction. Alternatively, adapter ring 4 can be attached to Adjustable ring 3 though the same fastener openings 14. Adapter ring 4 can have openings on top which are inwardly horizontal, and which complement openings 14, so the Adjustable ring 3 and Adapter ring 4 are attached. Adjustable ring 3 and adapter ring 4 move together. Fasteners 10 are used to attach adjustable ring 3 to adapter ring 4. Adjustable ring 3 and adapter ring 4 can have the same diameter and sit on top of each other, to form a uniform cylinder. With adapter ring 4, the junction box is suitable for attachment of a surface mount light 30.

Figure 8:
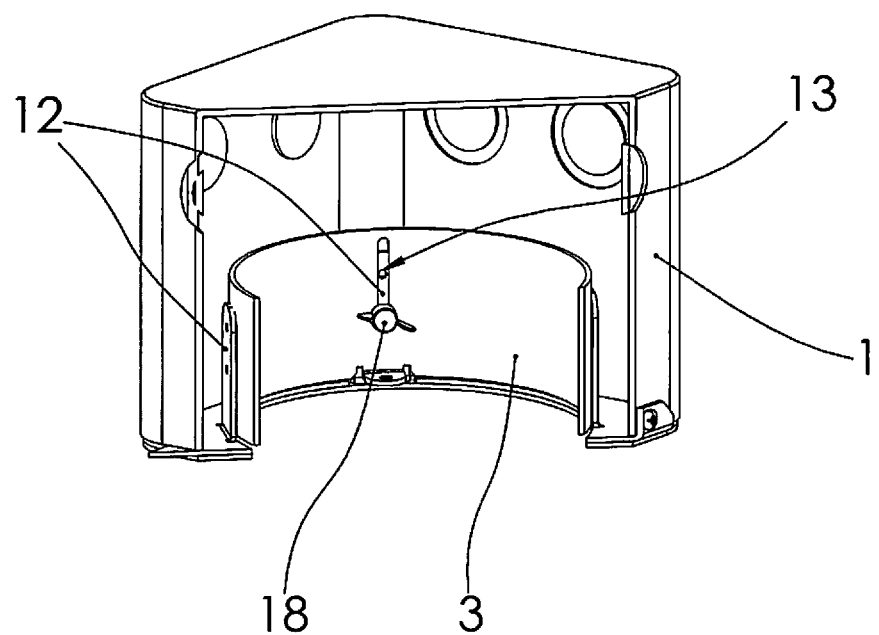
FIG. 8 illustrates cut-off view of the junction box.

FIG. 8 illustrates cut-off view of the junction box 1 with adjustable ring 3 inside. Track 13 of adjustable ring 3 is attached to tab 12. As illustrated, track 13 is attacked to the lower opening of tab 12. Adjustable ring 3 moves vertically along track 13 and can be adjusted at any position along track 13 with fastener 18. A user can use either the upper or lower openings of tab 12.

As illustrated, Adjustable ring 3 is attached to the upper opening of tab 12 of frame 5, and is in the most upper position as allowed by track 13. Adjustable Ring 3 can be attached to any tab 12 of frame 5.

Figure 9:
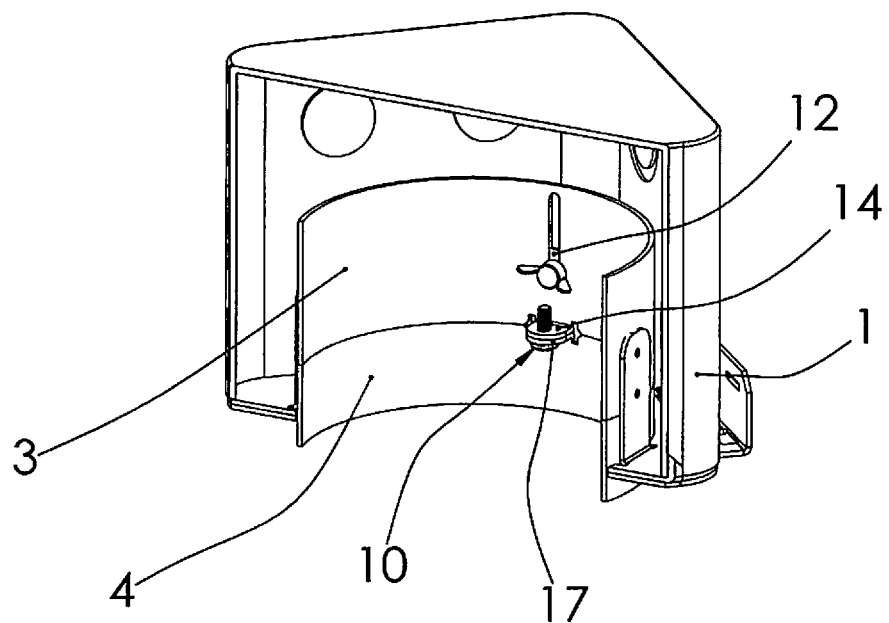
FIG. 9 illustrates cut-off view of the junction box

FIG. 9 illustrates a cut-off view of adjustable ring 3 and adapter ring 4 inside of junction box 1. Adjustable ring 3 and adapter ring 4 are attached to reach other through fasteners openings 14 and 17 which complement each other. Fastener 10 is used for the attachment. Adjustable rings 3 and 4 form a cylinder with a uniform diameter.

Figure 10:
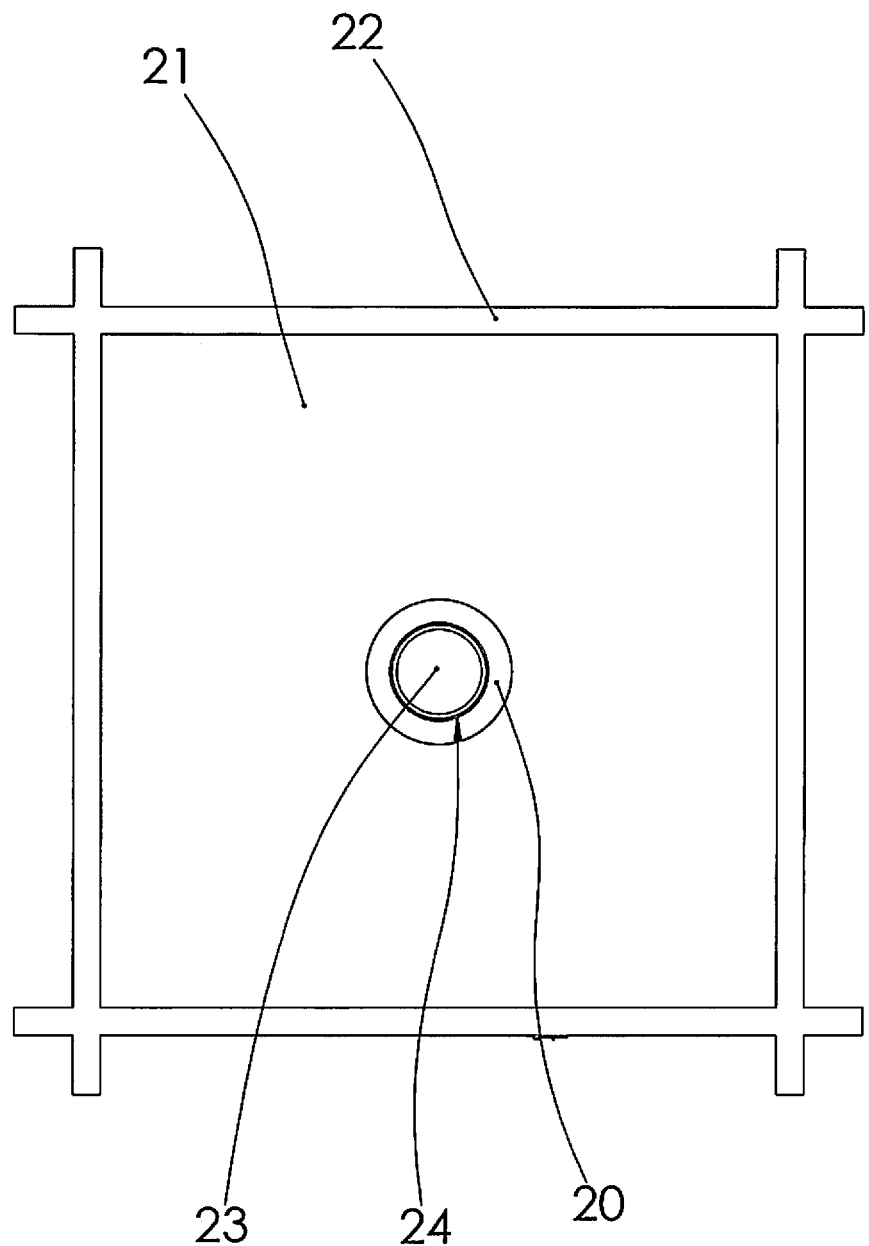
FIG. 10 illustrates a bottom view of a recessed light placed inside a ceiling.

FIG. 10 illustrates a bottom view of a recessed light 20 placed inside a ceiling 21. The bottom lens 23 (below the LED source of light 27) and trim 24 of the light fixture is visible in this view. The edge of trim 24 is placed under ceiling 21.

Figure 11:
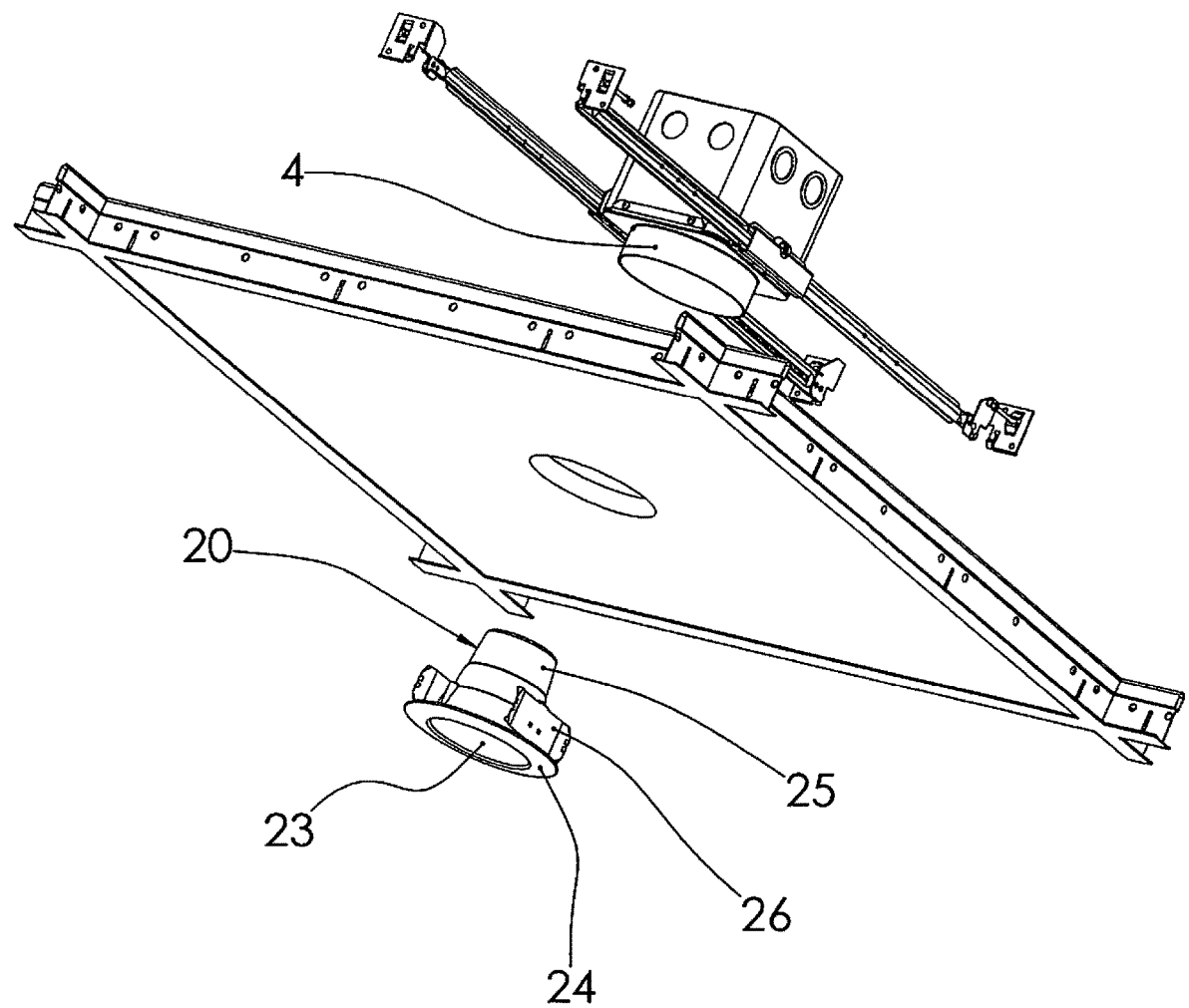
FIG. 11 illustrates an exploded view of a recessed light, the ceiling, and the fire-resistant housing.

FIG. 11 illustrates an exploded view of a recessed light 20, the ceiling 21, and fire rated housing 2. Adapter ring 4 extends down to match the height of the ceiling. Visible in this view are housing 25, clip 26, lens 23, and trim 24. Clips 26 hold the recessed light 20 inside of junction box 1. Adapter ring 4 is attached in this embodiment to make the housing 2 suitable for receiving a recessed light 20. The recessed lights 20 can have a 3 inch or 4 inch aperture. The recessed lights 20 fixtures can have an open trim, reflector trim, or a baffle trim, and be circular or square.

Figure 12:
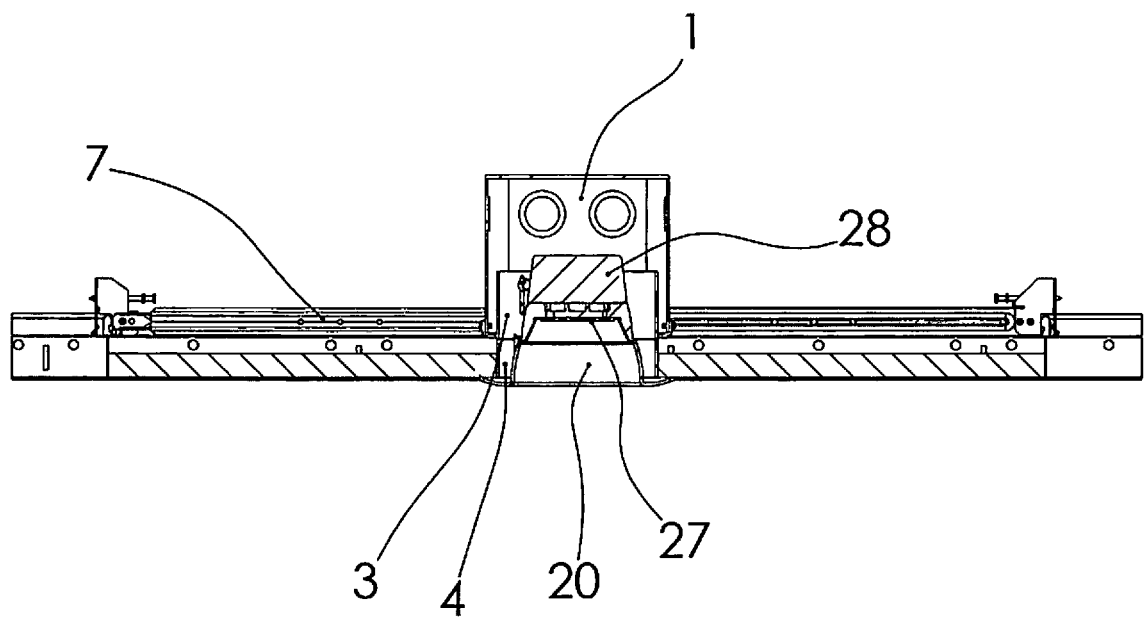
FIG. 12 illustrates a cut-off view of the recessed light placed inside of the junction box.
Figure 13:
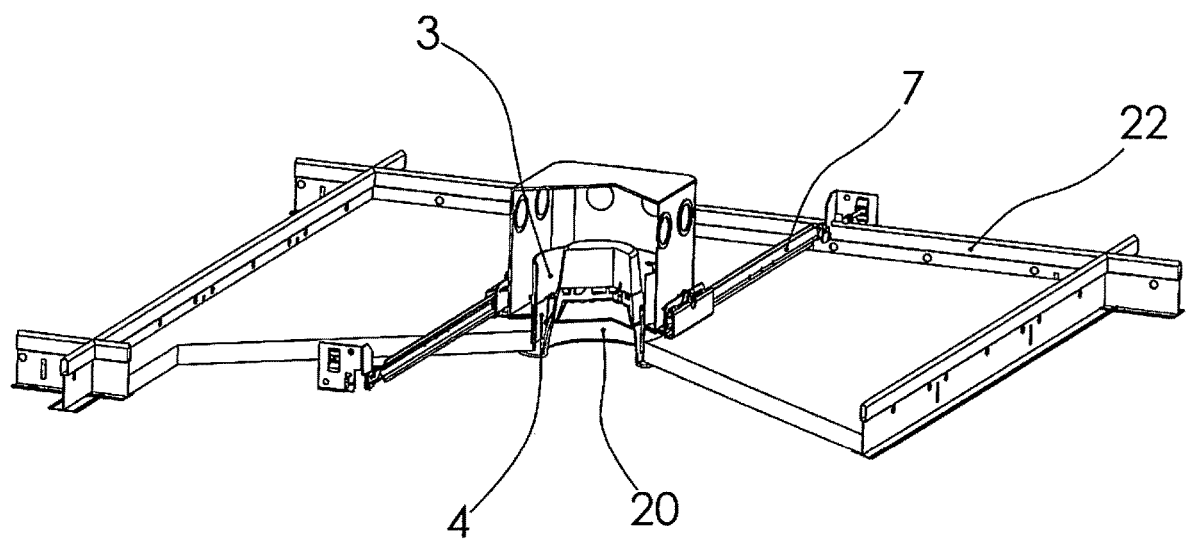
FIG. 13 illustrates a cut-off view of the recessed light placed inside of the junction box.

FIGS. 12 and 13 illustrate a cut-off view of the recessed light 20 placed inside of junction box 1. Adjustable ring 3 and adapter ring 4 are attached to each other on top of each other. Bar hanger 7 is attached to the T-Bar 22.

Figure 14:
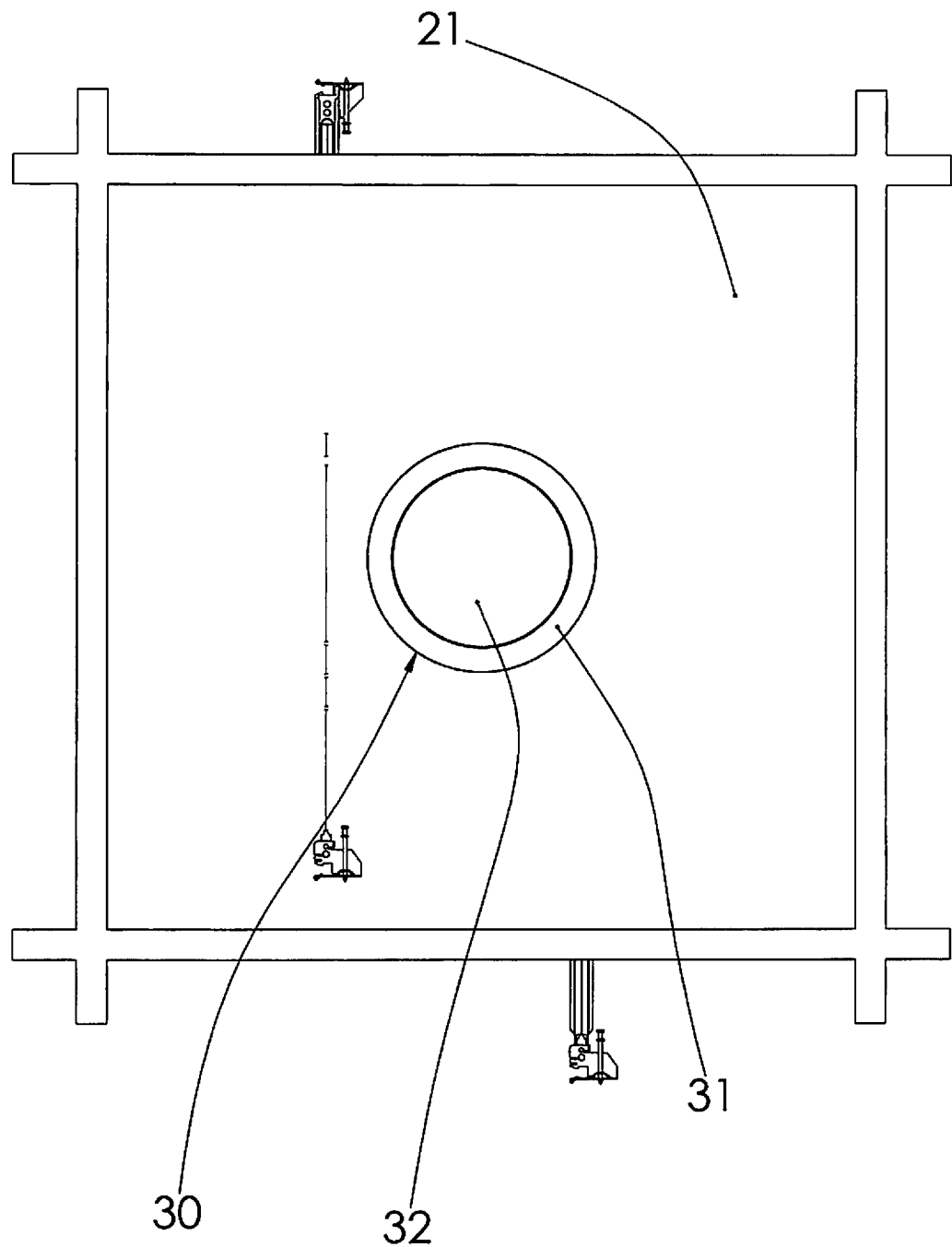
FIG. 14 illustrates a bottom view of a surface mounted light fixture attached to ceiling through junction box.

FIG. 14 illustrates a bottom view of a surface mounted light fixture 30 attached to ceiling 21 through junction box 1. The surface mount fixture can have trim 31, and lens 32.

Figure 15:
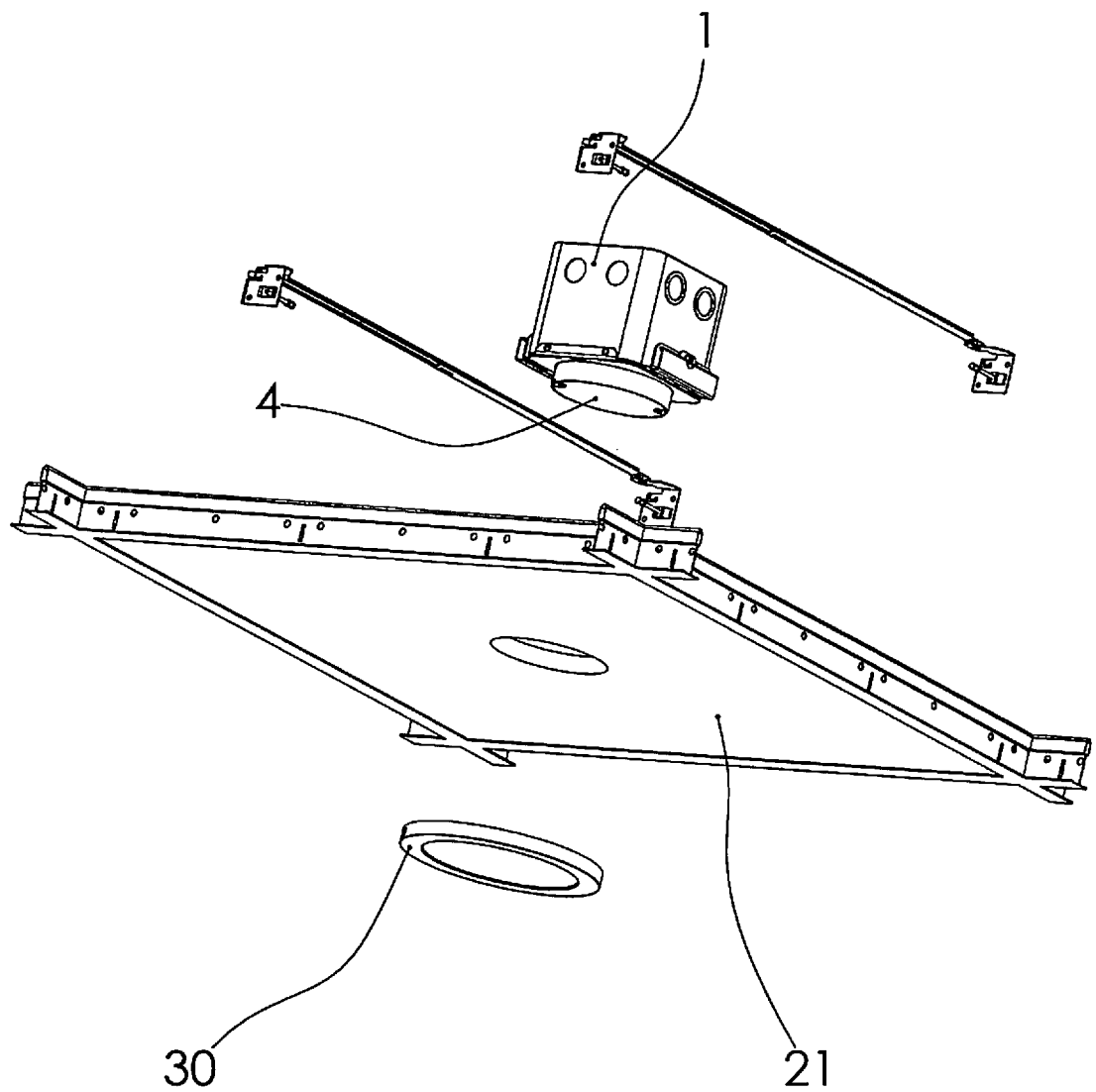
FIG. 15 illustrates an exploded view of the surface mount light fixture, the ceiling, and the junction box.
Figure 16:
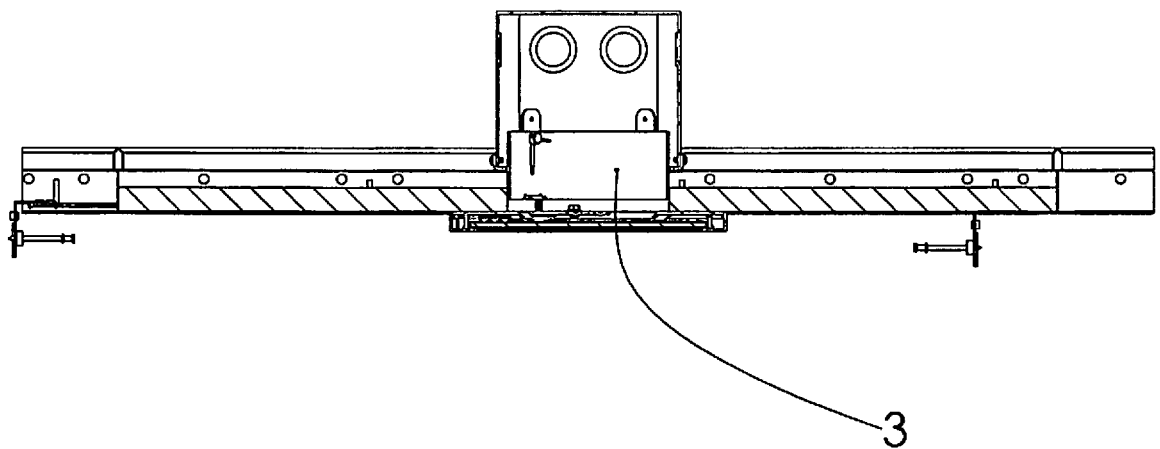
FIG. 16 illustrates a side view of the surface mount light fixture, the ceiling, and the junction box.

FIG. 15 illustrates an exploded view of the surface mount light fixture 30, the ceiling 21, and the junction box 1. Adapter ring 4 extends down slightly in this illustration. In some embodiments, adapter ring 4 can be flush. FIG. 16 illustrates a side view. In this embodiment, the bottom of adjustable ring 3 is attached to the top of the surface mounted light fixture 30 through fastener 10

Figure 17:
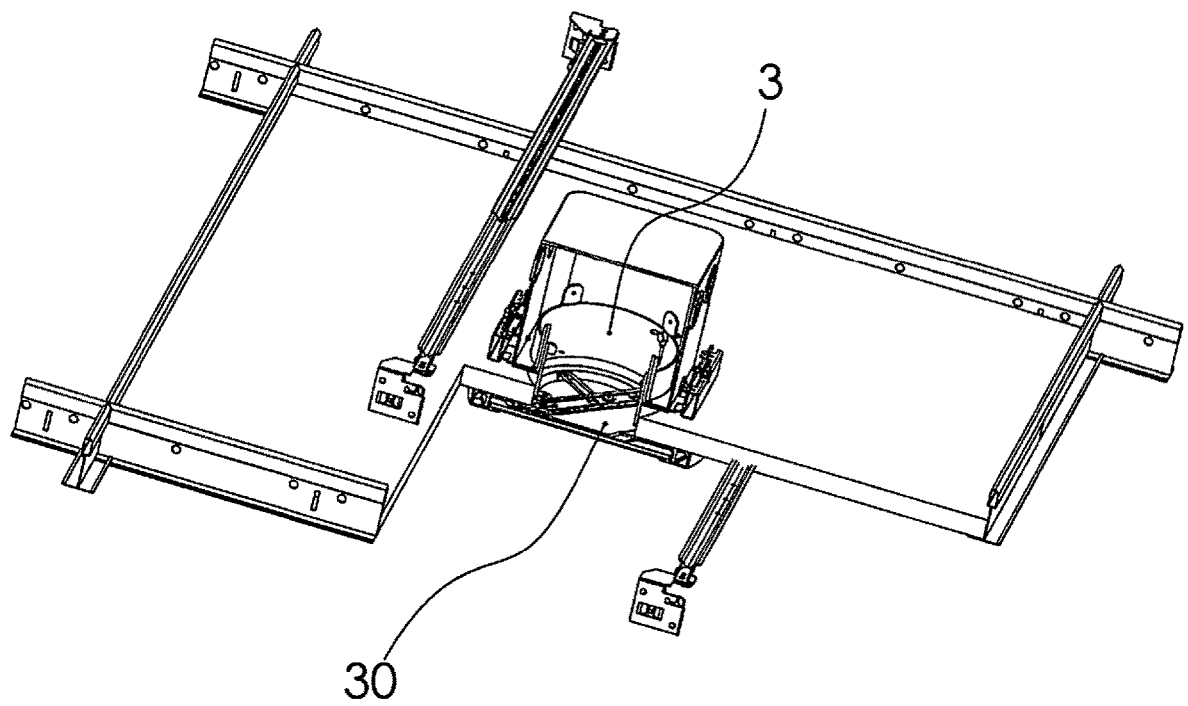
FIG. 17 illustrates a cut-off view of the surface mount light fixture, the ceiling, and the junction box.

FIG. 17 illustrates a cut-off view of the surface mounted light fixture 30 attached below the ceiling 21. The surface mounted light 30 is attached directly to adjustable ring 3.

To install housing 2, a user can locate a suitable position and attach the bar hangers 7 to joists. A user can slide the junction box 1 along bar hangers 7 to a desired location. A user can fasten locking screws on both bar hangers 7 to secure the junction box 1 (housing 2) on position. A user can insert wires into the junction box 1.

The junction box 1 is placed to position and the bar hangers 7 are attached into the notch on T-bars 22. The locking screws on both bar hangers 7 are fastened. The vertically adjustable bottom ring 3 adapts to different ceiling 21 thickness. The vertically adjustable ring 3 can be flush with ceiling 21 or slightly regressed. As illustrated in FIG. 6, depending on whether opening 15a or 15b is used, the adapter ring 4 extends below the junction box 1 and its height is used to adjust for the height of the ceiling 21. When opening 15a is used, adapter ring 4 can extend below the junction box 1 from a minimum of ⅞ of an inch to a maximum of land ⅝ of an inch. When opening 15b is used, adapter ring 4 can extend below the junction box from a minimum of ⅜ of an inch to a maximum of 1 and ¼ of an inch.

REFERENCES

1. Junction Box
2. Housing
3. Adjustable ring
4. Adapter ring
5. Frame
6. Openings (on Junction box)
7. Bar hanger
8. Gasket
9. Bracket 9Bar hanger holder)
10. Fastener (attaching the rings together)
11. Blank
12. Tab
13. Track
14. Fastener opening (on ring 3)
15. Opening on tab (15a and 15b openings)
16. Blank
17. Fastener opening on ring 4
18. Fastener (Wing)
19. Blank
20. Recessed light fixture
21. Ceiling
22. T-bar
23. Lens
24. Trim
25. Blank
26. Blank
27. LED light source
28. Ballast
29. Blank
30. Surface mount light
31. Trim
32. Lens
33. Fastener

What is claimed is:

1. An adaptable fire-resistant housing for a light fixture, comprising: a junction box made from steel, the junction box having sides and an opening on a bottom configured to receive the light fixture, the junction box having a plurality of openings on the sides for passage of wires; an adjustable ring attached to the bottom of the junction box, the adjustable ring having an opening configured to be attached to the light fixture; wherein the light fixture is attached to the adjustable ring; further comprising a frame attached to the bottom of the junction box; wherein the frame is a substantially planar disc with a square profile on an outside of the frame and a circular profile on an inside of the frame; wherein the frame further comprises a plurality of separate vertically upward tabs for direct attachment to a plurality of respective opposing outside surfaces of the junction box; wherein at least two opposing pairs of the separate vertically upward tabs are arranged symmetrically about a center of the frame; wherein the at least two opposing vertically upward tabs are disposed between a respective outside surface of the junction box and a respective mounting flange configured to couple the frame to a respective mounting rail; and a second vertically upward portion for attachment to the adjustable ring.

2. An adaptable fire-resistant housing for a light fixture, comprising: a junction box, the junction box having sides and an opening on a bottom configured to receive the light fixture, the junction box having a plurality of openings on the sides for passage of wires; a frame attached to the bottom of the junction box; and a ring attached to the frame, the ring configured to be attached to the light fixture; wherein the frame is a substantially planar disc with a square profile on an outside of the frame and a circular profile on an inside of the frame; wherein the frame further comprises a plurality of separate vertically upward tabs for direct attachment to a plurality of respective opposing outside surfaces of the junction box; wherein at least two opposing pairs of the separate vertically upward tabs are arranged symmetrically about a center of the frame; wherein the at least two opposing vertically upward tabs are disposed between a respective outside surface of the junction box and a respective mounting flange configured to couple the frame to a respective mounting rail; and a second vertically upward portion for attachment to the ring.

3. The adaptable fire-resistant housing of claim 2, wherein the ring is an adjustable ring.

4. The adaptable fire-resistant housing of claim 3, wherein the adjustable ring has a track configured to be adjusted in a vertical direction.

5. The adaptable fire-resistant housing of claim 3, wherein the adjustable ring is adjustably attached to the frame.

6. The adaptable fire-resistant housing of claim 4, wherein the adjustable ring is attached to the second vertically upward portion of the frame.

7. The adaptable fire-resistant housing of claim 3, further comprising an adapter ring attached to a bottom of the adjustable ring.

8. The adaptable fire-resistant housing of claim 7, wherein the adjustable ring and the adapter ring have complementary openings for a fastener.

9. The adaptable fire-resistant housing of claim 7, wherein the adjustable ring and the adapter ring have complementary tabs that are perpendicular to the sides of the adjustable ring and adapter ring and are attached to each other with a fastener.

10. The adaptable fire-resistant housing of claim 7, wherein the adjustable ring is configured to be attached to a surface mount light.

11. The adaptable fire-resistant housing of claim 2, wherein the junction box has a height of about 12 to 20 cm.

12. The adaptable fire-resistant housing of claim 2, wherein the junction box is a cuboid with sharp or round corners, and has a width of about 10 cm to 16 cm.

13. An adaptable fire-resistant housing for a recessed light fixture, comprising: a junction box, the junction box having sides and an opening on a bottom configured to receive a light fixture, the junction box having a plurality of openings on the sides for passage of wires; a frame attached to the bottom of the junction box; an adjustable ring attached to the frame, the adjustable ring having a vertical track that slides relative to the frame, the adjustable ring further having one or more openings; and an adapter ring with one or more openings that are complementary to the openings of the adjustable ring; wherein the adjustable ring is configured to be attached to a surface mount light or to the adapter ring; and wherein the junction box with the adapter ring is configured to receive the recessed light fixture; wherein the adapter ring is configured to extend below the junction box and compensate for the height of a ceiling; wherein the frame is a substantially planar disc with a square profile on an outside of the frame and a circular profile on an inside of the frame; wherein the frame further comprises a plurality of separate vertically upward tabs for direct attachment to a plurality of respective opposing outside surfaces of the junction box; wherein at least two opposing pairs of the separate vertically upward tabs are arranged symmetrically about a center of the frame; wherein the at least two opposing vertically upward tabs are disposed between a respective outside surface of the junction box and a respective mounting flange configured to couple the frame to a respective mounting rail; and a second vertically upward portion for attachment to the adjustable ring.

14. The adaptable fire-resistant housing of claim 13, wherein the second vertically upward portion of the frame has two openings, each opening configured to be attached to the adjustable ring.

15. The adaptable fire-resistant housing of claim 13, wherein the adjustable ring has a vertical track on a side, and at least two horizontally oriented openings on the bottom inside of the adjustable ring.

16. The adaptable fire-resistant housing of claim 13, wherein the adapter ring has at least two horizontally oriented openings on the top of the adapter ring.

* * * * *